(12) United States Patent
Pac Gracia

(10) Patent No.: US 8,820,518 B2
(45) Date of Patent: Sep. 2, 2014

(54) ACCUMULATING CONVEYOR

(71) Applicant: Tunkers Iberica S.L., Badalona (ES)

(72) Inventor: Jose Pac Gracia, Castelldefels Barcelona (ES)

(73) Assignee: Tunkers Iberica S.L., Badalona (Barcelona) (ES)

( * ) Notice: Subject to any disclaimer, the term of this patent is extended or adjusted under 35 U.S.C. 154(b) by 0 days.

(21) Appl. No.: 13/993,380

(22) PCT Filed: Nov. 16, 2012

(86) PCT No.: PCT/EP2012/004758
§ 371 (c)(1),
(2), (4) Date: Jun. 12, 2013

(87) PCT Pub. No.: WO2013/079166
PCT Pub. Date: Jun. 6, 2013

(65) Prior Publication Data
US 2014/0054134 A1    Feb. 27, 2014

(30) Foreign Application Priority Data

Dec. 1, 2011   (DE) .................... 20 2011 108 531 U

(51) Int. Cl.
*B65G 35/08* (2006.01)
*B65G 35/06* (2006.01)

(52) U.S. Cl.
CPC .............. *B65G 35/08* (2013.01); *B65G 35/06* (2013.01)
USPC ........................................ 198/795; 198/803.2

(58) Field of Classification Search
CPC ...... B65G 35/08; B65G 35/06; B65G 17/002; B65G 17/005; B65G 17/007; B65G 17/06; B61B 13/125; B61B 10/025
USPC ...................... 198/867.14, 795, 803.2, 465.3; 104/166, 171
See application file for complete search history.

(56) References Cited

U.S. PATENT DOCUMENTS

| | | | | |
|---|---|---|---|---|
| 4,088,220 | A * | 5/1978 | Jacksch et al. | 198/803.2 |
| 5,076,132 | A * | 12/1991 | Hsieh | 84/421 |
| 5,387,836 | A * | 2/1995 | Adachi et al. | 313/468 |
| 5,388,684 | A * | 2/1995 | Peck | 198/465.1 |
| 5,549,192 | A * | 8/1996 | Zaguroli, Jr. | 198/795 |
| 5,590,756 | A * | 1/1997 | Zaguroli, Jr. | 198/795 |
| 5,735,384 | A * | 4/1998 | Lingo et al. | 198/465.1 |
| 5,873,432 | A * | 2/1999 | Cho | 182/72 |
| 6,047,813 | A | 4/2000 | Herzog et al. | |
| 6,070,534 | A * | 6/2000 | Lehrieder | 104/172.3 |
| 6,415,906 | B2 * | 7/2002 | Bethke et al. | 198/465.1 |
| 7,191,891 | B2 * | 3/2007 | Hoveling | 198/345.3 |

FOREIGN PATENT DOCUMENTS

KR    10-0964493    6/2010

OTHER PUBLICATIONS

English Translation of International Preliminary Report on Patentability mailed Jun. 12, 2014 in corresponding international application No. PCT/EP2012/004758.

* cited by examiner

*Primary Examiner* — James R Bidwell
(74) *Attorney, Agent, or Firm* — Antonelli, Terry, Stout & Kraus, LLP.

(57) ABSTRACT

The invention relates to an accumulating conveyor, in particular for use in the motor vehicle industry, for example for conveying body parts on pallets. The pallets are automatically coupled in a form-fitting manner at the reversing station or at the reversing stations by at least one centering pin, wherein, after the relevant reversing station has been passed, the centering pin or the centering pins is or are automatically released again.

17 Claims, 3 Drawing Sheets

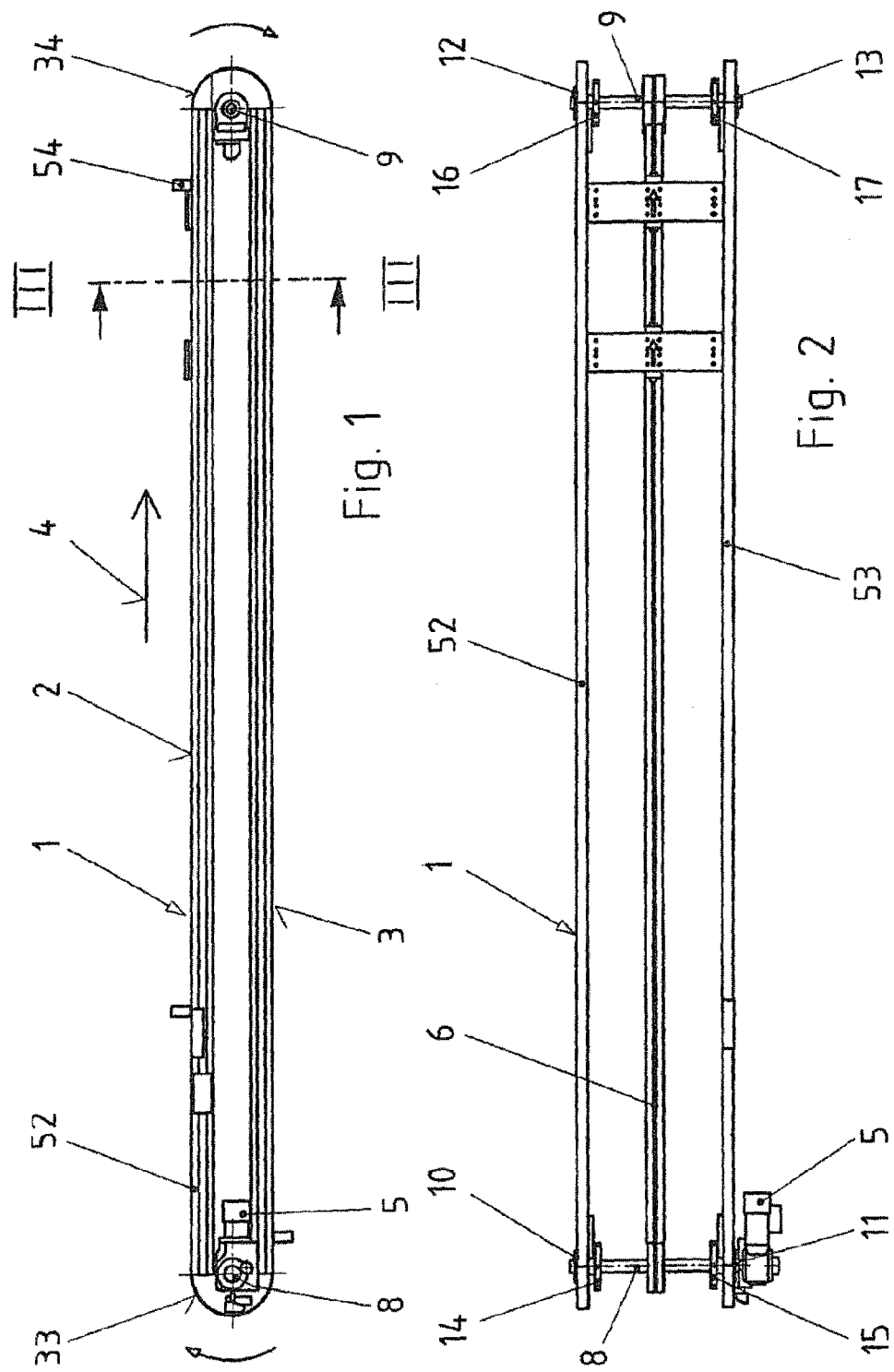

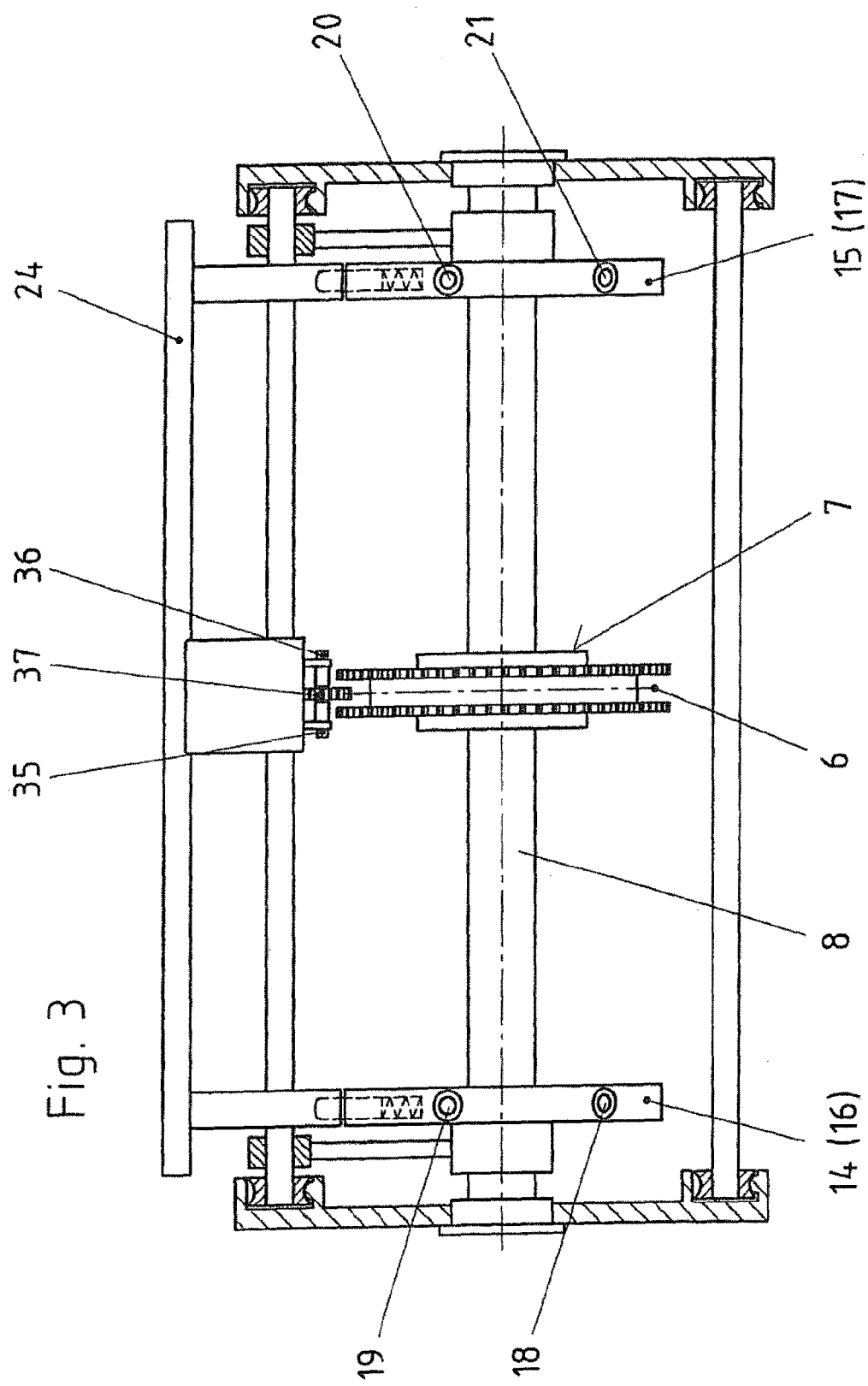

ACCUMULATING CONVEYOR

BACKGROUND OF THE INVENTION

1. Field of the Invention

The invention relates to an accumulating conveyor, in particular for use in the motor vehicle industry, for example for conveying body parts.

2. Description of the Related Art

Accumulating conveyors are known. They generally consist of a motor-driven bottom strand and top strand which are used to convey pallets which serve to receive workpieces, for example sheet-like parts from body manufacturing, and from or else to which components can be removed or can also be supplied, for example manually, or else also by a robot arm. The strands of accumulating conveyors of this type move in two planes which are arranged one above the other and are generally horizontal, and run endlessly via reversing stations arranged at a distance from one another.

The invention is based on the problem of inventively refining an accumulating conveyor of the required type in such a manner that even heavier pallets are easily driven in a slip-free manner in the region of the reversing stations using structurally simple means.

The problem on which the invention is based is solved by an accumulating conveyor, in particular for use in the motor vehicle industry, for example for conveying body parts on pallets, comprising a flexible tension element which is driven, for example continuously, by motor, for example a chain or a belt which is guided in the region of the reversing stations via gear elements arranged on one shaft each, for example one drive wheel in each case, wherein the tension element is coupled to the relevant pallet by a device which can be actuated by a frictional connection, wherein the relevant shaft of the reversing station is assigned one driver wheel on either side of the shaft, said driver wheel having numerous recesses which are in each case arranged at preferably uniform angular distances from one another over the circumference of said driver wheel and in which a centering pin which is loaded by a compression spring is in each case arranged in a longitudinally displaceable manner, wherein, during the driving of the pallets from the top strand to the bottom strand and from the bottom strand to the top strand of the flexible tension element, in each case at least one centering pin of each driver wheel of the relevant shaft automatically engage in a form-fitting manner in recesses arranged on the underside of the relevant pallet and, after the relevant reversing station has been passed, also automatically slide out of said recesses again.

In the case of the invention, in the region of the loading and unloading station, even heavy pallets are conveyed in a slip-free manner from the top strand to the bottom strand and from the bottom strand to the top strand in a form-fitting manner via the centering pins and the driver wheels provided here. The centering pins engage automatically in recesses provided therefor on the underside of the relevant pallet and, at the bottom strand or top strand, also automatically come free again from said recesses after the pallet has been conveyed through the relevant reversing station by the tension element—chain or belt—which is driven, for example, continuously. Therefore, even heavy and loaded pallets are conveyed in a secure and slip-free manner through the reversing stations.

A possible embodiment of an accumulating conveyor arrange the recesses for the centering pins radially with respect to the center point of rotation of the relevant shaft, and therefore to the center point of rotation of the associated driver wheel. The centering pins can thereby be arranged in such a manner that, for example, of each driver wheel at the associated reversing station, for example in each case a plurality of centering pins, in particular two centering pins, grasp the relevant pallet in each case in a form-fitting manner.

A possible embodiment of an accumulating conveyor may couple the centering pins to the coupling recesses of a pallet over an angle of rotation range of approximately 180 degrees.

In a possible embodiment the pallets may be still coupled in the region of their horizontal in the region of the top strand as far as the horizontal region in the bottom strand to the driver wheels by the centering pins in a radially resilient and form-fitting manner. As a result, a secure and form-fitting connection or coupling to the pallets to be conveyed is produced virtually over the entire region of a reversing station.

A possible embodiment of an accumulating conveyor may have a braking device arranged next to the relevant driver wheel, said braking device braking the speed of the relevant pallet to zero or to the creep speed. This means that each reversing station has two braking devices of this type, and therefore even pallets conveyed up rapidly can be braked in order to ensure reliable entry of the centering pins into the cutout on the underside of the relevant pallet. For this purpose, for example, said cutouts on the underside can be elongated in the conveying direction or provided with run-on slopes.

A possible embodiment of the accumulating conveyor may be configured in such a manner that the pallets are forcibly guided on both sides of the accumulating conveyor in rails by means of guide rollers. Said rails can be, for example, of U-shaped design.

In a preferred embodiment, each reversing station has a drive wheel, wherein the underside of each pallet has two spaced-apart, central pallet pinions which are subjected to optionally adjustable friction force by brake pins, wherein the frictional connection to the tension element, which is optionally driven continuously, is overcome when the pallet comes to a standstill or the drive speed thereof is decelerated by means of a stopping device or by means of the braking device in the region of the reversing station. The flexible tension element may proceed continuously when the pallets are piled up or braked.

According to the invention, the underside of each pallet has, on opposite sides, at least one braking roller interacting with each braking device arranged here. A tilt-free braking to a standstill or into the creep speed of the relevant pallet is thereby brought about.

A possible embodiment of the accumulating conveyor may have an asynchronous drive motor for driving the flexible tension element, the rotational speed of which is regulable.

An embodiment of the accumulating conveyer may comprise an asynchronous motor driving the flexible tension element only in one conveying direction.

A possible embodiment of the accumulating conveyor may be advantageously assigned at least one stopping device.

Said stopping device can be used to stop the pallets in the conveying region such that the following pallets can catch up. The activation of a stopping device of this type can be incorporated into an SPC. The conveyor may also be assigned more than one stopping conveyor. Stopping conveyors of this type may be in addition to the braking devices at the particular reversing station or the reversing stations.

The invention is illustrated—partially schematically—with reference to an exemplary embodiment in the drawing, in which:

BRIEF DESCRIPTION OF THE DRAWINGS

FIG. 1 shows a side view of an accumulating conveyor;
FIG. 2 shows a top view of FIG. 1;

FIG. 3 shows a section along line of FIG. 1;

DETAILED DESCRIPTION OF THE INVENTION

Figure 4:
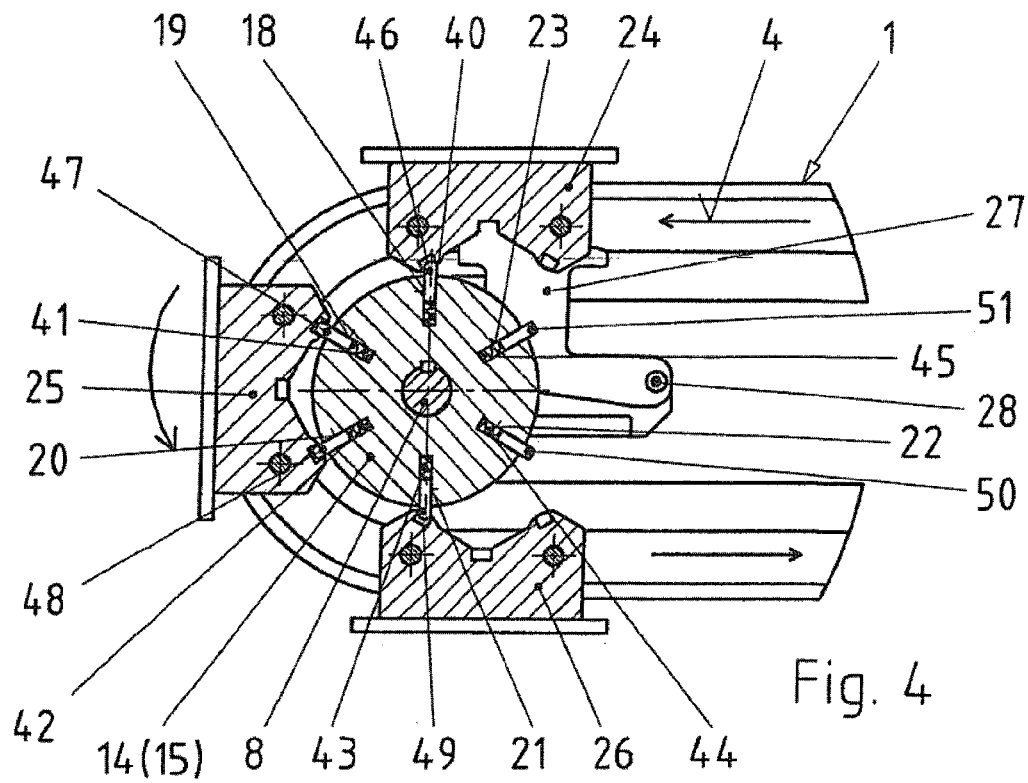
FIG. 4 shows a detail of a reversing station of FIG. 1, illustrated partially broken off and partially in section.

An accumulating conveyor which has a top strand 2 and a bottom strand 3 is denoted overall in the drawing by the reference number 1. In the drawing, the direction of movement is indicated by the arrow 4. The accumulating conveyor 1 is driven via a drive motor 5, for example the rotational speed of which is regulable and is formed, for example, as an asynchronous motor. A centrally arranged, flexible tension element, for example a chain or a belt which is driven continuously by the drive motor 5, is denoted by the reference number 6.

The reference number 7 denotes a pinion, while 8 and 9 are shafts. The shafts 8 and 9 are mounted with little friction on both sides in bearings 10, 11 and 12, 13, for example in ball bearings. In the end region on both sides, each shaft 8 or 9 bears one driver wheel 14, 15 or 16, 17 in each case. Each driver wheel 14-17 has recesses which are arranged at uniform angular distances from one another over the circumference of said driver wheel, are in the form, for example, of bores and of which only the recesses 18, 19, 20, 21, 22 and 23 are illustrated in FIG. 4. In the embodiment illustrated, all of the driver wheels 14 to 17 are designed with an identical shape and have, for example, the same number of recesses 18-23 but, if the need arises, can also be designed differently, for example can have a smaller or greater number of recesses than illustrated.

Figure 5:
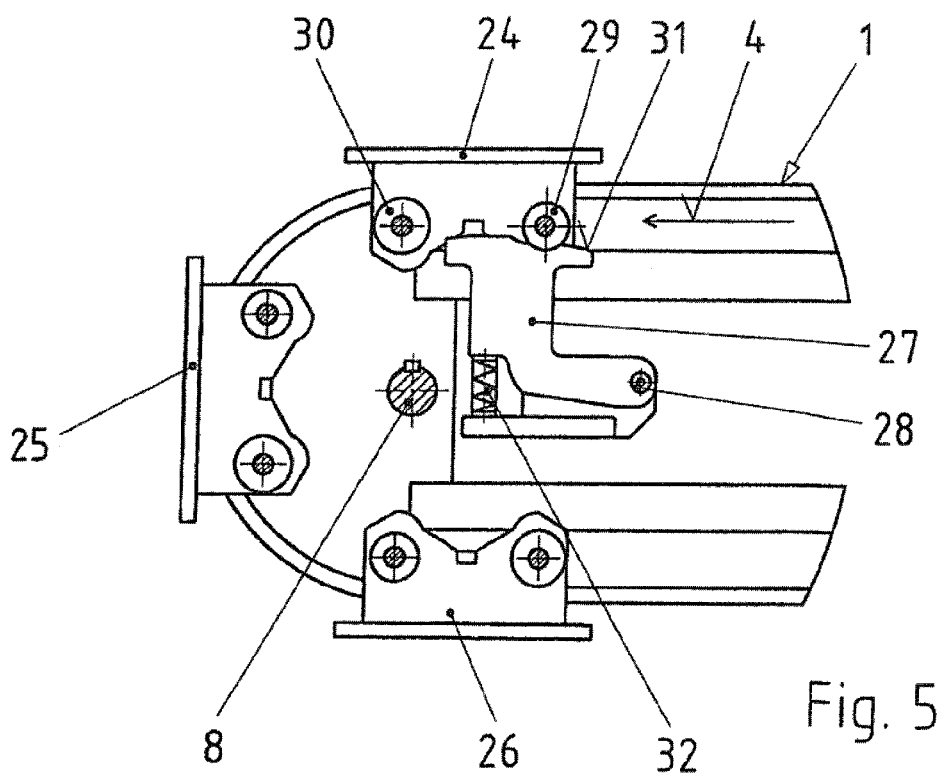
FIG. 5 shows a further detail of the reversing station which can be seen in FIG. 4 together with braking rollers and a brake disk and three pallets in various conveying positions.

In FIGS. 4 and 5, the reference numbers 24, 25, 26 denote three pallets in different transportation positions while 27 relates to a braking device with a braking arm which is illustrated in FIGS. 4 and 5 as an angle lever which is arranged so as to be able to swing about an axis 28. A braking roller assigned to the relevant pallet 24 is denoted by 29 while, at 30, a guide roller is arranged on the pallet 24. The braking roller 29, upon running onto a slope 31, presses the braking device 27 downwards counter to the resetting force of a spring element 32 and thereby decelerates the movement of the pallet 24 in the movement thereof in the direction of the arrow 4 to a standstill or to a type of creep speed. Each of the driver wheels 14 to 17 can be assigned to one braking device 27 of this type, with which braking devices braking rollers 29 in each case interact. On each side at one or at both reversing stations, a braking device 27 of this type with a braking roller 29, spring element 32 and axis 28 is in each case arranged on opposite sides in order to avoid tilting of the pallets, or guide rollers 30 which run in rails 52 are arranged on both sides of the pallets.

The driver wheels 14 to 17 are in each case assigned protective devices 33 and 34 which, as covering plates, cover the relevant driver wheels 14 to 17 outwards at a distance.

The reference numbers 35, 36 denote braking pins which are spring-loaded and which bring about a frictional connection with the pallet pinions 37 or the like, which are assigned to the relevant pallet 24, by means of friction. Each pallet 24-26 has a device of this type. The springs press the braking pins 35 and 36 against corresponding friction surfaces of the pallet pinions 37 in the manner of a friction brake and thus produce a frictional connection. When the tension element 6 exceeds the drive force, the friction is overcome, and therefore the relevant pallet can be decoupled from the tension element 6 or the like and piled up.

A compression spring element 40, 41, 42, 43, 44 and 45 which in each case loads a centering pin 46, 47, 48, 49, 50 and 51 radially outwards is in each case arranged in the recesses 18 to 23. The centering pins 46 to 51 are arranged at a uniform angular distance in the recesses 18 to 23, which are directed radially with respect to the center point of the shaft 8. All of the other driver wheels 14 to 17 which are not visible in the drawing are configured in the same manner. The number of centering pins can be greater or smaller than illustrated in the drawing. It is also conceivable to assign a different number of centering pins with corresponding compression spring elements 40 to 45 or the like to the individual driver wheels 14 to 17.

The guide rollers of each pallet, which guide rollers are arranged on both sides of each pallet, are in each case forcibly guided in U-shaped rails 52, 53.

The underside of each pallet has, on opposite sides, a plurality of coupling openings in which, on opposite sides of each pallet, at least in each case one centering pin, but preferably in each case two centering pins, engage in a form-fitting manner during circulation through a reversing station and convey the pallet in a tilt-free and jerk-free manner from the top strand 2 to the bottom strand 3 and from the bottom strand 3 to the top strand 2.

The reference number 54 denotes a stopping device by means of which the pallets are stopped when required. A plurality of stopping devices of this type can be provided over the conveying path of the accumulating conveyor 1, when required. The manner of operation, in particular the control thereof, is incorporated into a stored program control (SPC). If a pallet is released by the stopping device 54, the pallet is conveyed further in the conveying direction 4 and is stopped again, or the conveying speed thereof is decelerated to the creep speed, in the region of the relevant reversing station such that the centering pins 46-51 can engage in a form-fitting manner in the corresponding openings on the underside of the particular pallet without disturbance.

The manner of action is as follows:

The embodiment illustrated substantially has the task of conveying the pallets 24 from the top strand 2 to the bottom strand 3 or from the bottom strand 3 to the top strand 2 without disturbance.

The shaft 8, which is driven continuously by the central pinion 7 at the relevant reversing station via the chain 6 or a belt also conveys the pallet 24 et seq. In each case two of the driver wheels 14 to 17 are arranged at an axial distance from each other on the same shaft 8 or 9. In the embodiment illustrated, each driver wheel 14, 15 or 16, 17 has six centering pins 46, 47, 48, 49, 50 and 51 which, for example in each case two, engage in a form-fitting manner in the matching receiving openings and therefore reliably convey the relevant pallet 24 in the region of the relevant reversing station. The pallet 24 moves in a forcibly guided manner through the rail-like profiles 52 and 53, and the flexible tension means, in particular a chain 6, drives the pallets 24-26 by means of the central pallet pinions 37 which are subjected by spring elements to the controlled or adjustable frictional driver force of the braking pins 35 and 36. When a pallet 24 arrives at the stopping device 54, the pallet pinions 37 begin to rotate freely corresponding to the speed of the drive chain 6. The pallet 24 stops. During the continued movement, the pallet 24 or the like is carried along by a form-fitting connection (latching) by, for example, in each case two centering pins on opposite sides of the two driver wheels 14, 15 of the relevant reversing station. As a result, slipping of the pallets 24 is impossible.

The features described in the patent claims and in the description and also apparent from the drawing can be essential both individually and also in any combinations for implementing the invention.

REFERENCE NUMBERS

1 Accumulating conveyor
2 Top strand
3 Bottom strand
4 Direction of movement
5 Drive motor
6 Tension element, flexible
7 Pinion
8 Shaft
9 Shaft
10 Bearing
11 Bearing
12 Bearing
13 Bearing
14 Driver wheel
15 Driver wheel
16 Driver wheel
17 Driver wheel
18 Recesses
19 Recesses
20 Recesses
21 Recesses
22 Recesses
23 Recesses
24 Pallet
25 Pallet
26 Pallet
27 Braking device, braking arm
28 Axis
29 Braking roller
30 Guide roller
31 Slope
32 Spring element
33 Protective device
34 Protective device
35 Braking pin, frictional connection device
36 Braking pin, frictional connection device
37 Pallet pinion
38
39
40 Compression spring element
41 Compression spring element
42 Compression spring element
43 Compression spring element
44 Compression spring element
45 Compression spring element
46 Centering pin
47 Centering pin
48 Centering pin
49 Centering pin
50 Centering pin
51 Centering pin
52 Rail, forced guidance
53 Rail, forced guidance
54 Stopping device

The invention claimed is:

1. Accumulating conveyor, in particular for use in the motor vehicle industry, comprising:
a flexible tension element comprising a top strand and a bottom strand;
a motor configured to drive the flexible tension element;
a pair of reversing stations, each reversing station comprising:
a shaft having opposite sides;
a gear element arranged on the shaft, the gear element configured to guide the flexible tension element in a region of the reversing station;
a pair of driver wheels, each driver wheel of the pair assigned to opposite sides of the shaft, and each driver wheel of the pair comprising a plurality of recesses, each of the plurality of recesses containing:
a compression spring arranged in a longitudinally displaceable manner; and
a centering pin loaded by the compression spring;
at least one pallet comprising:
a device which can be actuated by a frictional connection, said device coupling the at least one pallet to the flexible tension element;
an underside; and
a plurality of recesses arranged on the underside,
wherein, during driving of the at least one pallet from the top strand to the bottom strand of the flexible tension element the centering pin of one of the plurality of recesses of each of the pair of driver wheels of one of the pair of reversing stations automatically engages in a form-fitting manner at least one of the plurality of recesses arranged on the underside of the at least one pallet,
wherein during driving of the at least one pallet from the bottom strand to the top strand of the flexible tension element the centering pin of one of the plurality of recesses of each of the pair of driver wheels of one of the pair of reversing stations automatically engages in a form-fitting manner at least one of the plurality of recesses arranged on the underside of the at least one pallet,
wherein after driving of the at least one pallet from the top strand to the bottom strand the centering pin of one of the plurality of recesses of each of the pair of driver wheels of one of the pairs of reversing station automatically slides out of at least one of the plurality of recesses arranged on the underside of the at least one pallet, and
wherein after driving of the at least one pallet from the bottom strand to the stand of the flexible tension member the centering pin of one of the plurality of recesses of each of the pair of driver wheels of one of the pair of reversing stations automatically slides out of at least one of the plurality recesses arranged on the underside of the at least one pallet.

2. Accumulating conveyor according to claim 1, wherein the shaft of one of the pair of reversing stations further comprises a center point of rotation, and
wherein the plurality of recesses of one of the pair of driver wheels of the shaft of the one of the pair of reversing stations are arranged radially with respect to the center point of rotation of the shaft.

3. Accumulating conveyor according to claim 1, wherein during driving of the at least one pallet from the bottom strand to the top strand of the flexible tension element the centering pin of one of the plurality of recesses of each of the pair of driver wheels of one of the pair of reversing stations is coupled to one of the plurality of recesses arranged on the underside of the at least one pallet over an angle of rotation range of approximately 180°.

4. Accumulating conveyor according to claim 1, wherein the top strand of the flexible tension element comprises a horizontal region, wherein the bottom strand of the flexible tension element comprises a horizontal region, and wherein during driving of the at least one pallet from the to strand to the bottom strand of the flexible tension element the centering pin of one of the plurality of recesses of each of the pair of driver wheels of one of the pair of reversing stations engages at least one of the plurality of recess arranged on the underside of the at least one pallet in the horizontal region of the top strand as far as the horizontal region of the bottom strand in a radially resilient and form-fitting manner.

5. Accumulating conveyor according to claim 1, wherein at least one of the pair of reversing stations further comprises a braking device arranged next to at least one of the pair of driver wheels of the at least one of the pair of reversing stations, said braking device configured to brake the speed of the at least one pallet to one of zero and a creep speed.

6. Accumulating conveyor according to claim 1, further comprising a pair of rails disposed on opposite sides of the flexible tension element,
    wherein the at least one pallet further comprises guide rollers, and
    wherein said pair of rails are configured to forcibly guide the at least one pallet by the guide rollers.

7. Accumulating conveyor according to claim 5, wherein the device which can be actuated by a frictional connection of the at least one pallet comprises:
    two brake pins on the underside of the at least one pallet;
    two spaced-apart, central pallet pinions configured to be subjected to adjustable friction force by brake pins, and
    wherein the frictional connection to the flexible tension element is overcome when the at least one pallet is decelerated by means of the braking device.

8. Accumulating conveyor according to claim 5, characterized in that the underside of the at least one pallet has, on opposite sides, at least one braking roller configured to interact with the braking device.

9. Accumulating conveyor according to claim 1, characterized in that the motor configured to drive the flexible tension element is an asynchronous motor, the rotational speed of which is regulable.

10. Accumulating conveyor according to claim 1, characterized in that the flexible tension element drives the at least one pallet only in one conveying direction.

11. Accumulating conveyor according to claim 1, characterized in that at least one stopping device is assigned to the accumulating conveyor.

12. Accumulating conveyor according to claim 11, characterized in that the sequence of movement of the at least one pallet and the function of the stopping device are incorporated into a stored program control.

13. Accumulating conveyor according to claim 11, wherein the device which can be actuated by a frictional connection of the at least one pallet comprises:
    two brake pins on the underside of the at least one pallet;
    two spaced-apart, central pallet pinions configured to be subjected to adjustable friction force by brake pins, and
    wherein the frictional connection to the flexible tension element is overcome when the at least one pallet is decelerated by means of the stopping device.

14. Accumulating conveyor according to claim 1, wherein the flexible tension element comprises a chain.

15. Accumulating conveyor according to claim 1, wherein the flexible tension element comprises a belt.

16. Accumulating conveyor according to claim 1, wherein the plurality of recesses of at least one of the pair of driver wheels of at least one of the pair of reversing stations are arranged at uniform angular distances from one another over a circumference of said driver wheel.

17. Accumulating conveyor according to claim 1, wherein during driving of the at least one pallet from the top strand to the bottom strand of the flexible tension element the centering pin of one of the plurality of recesses of each of the pair of driver wheels of one of the pair of reversing stations is coupled to one of the plurality of recesses arranged on the underside of the at least one pallet over an angle of rotation range of approximately 180°.

* * * * *